(12) United States Patent
Rode

(10) Patent No.: US 8,500,108 B2
(45) Date of Patent: Aug. 6, 2013

(54) STACKABLE BELLEVILLE SPRING

(76) Inventor: John E. Rode, Fonda, NY (US)

( * ) Notice: Subject to any disclaimer, the term of this patent is extended or adjusted under 35 U.S.C. 154(b) by 131 days.

(21) Appl. No.: 12/540,799

(22) Filed: Aug. 13, 2009

(65) Prior Publication Data

US 2011/0037210 A1    Feb. 17, 2011

(51) Int. Cl.
*F16F 1/34*    (2006.01)

(52) U.S. Cl.
USPC .............................. 267/161; 267/162; 267/260

(58) Field of Classification Search
USPC ............... 267/161, 162, 46, 29, 260, 32, 158, 267/159, 160, 163, 164, 165
See application file for complete search history.

(56) References Cited

U.S. PATENT DOCUMENTS

| | | | |
|---|---|---|---|
| 82,276 A | 9/1868 | Belleville | |
| 1,819,281 A | 8/1931 | Dexter | |
| 1,826,579 A | 10/1931 | Brecht | |
| 1,901,898 A | 3/1933 | Clarke | |
| 2,162,719 A | 6/1939 | Hay | |
| 2,323,985 A | 7/1943 | Fausek et al. | |
| 2,432,717 A | 12/1947 | Berger | |
| 2,886,380 A | 5/1959 | Lambeek | |
| 3,029,071 A | 4/1962 | Wells | |
| 3,098,643 A | 7/1963 | Ondrejka | |
| 3,107,905 A | 10/1963 | Lucas | |
| 3,224,344 A | 12/1965 | Baumann et al. | |
| 3,313,552 A | 4/1967 | McElya et al. | |
| 3,394,631 A | 7/1968 | Thompson | |
| 3,791,499 A * | 2/1974 | Ryan | 192/70.27 |
| 3,831,923 A * | 8/1974 | Meldrum | 267/141 |
| 3,836,195 A | 9/1974 | Teeri | |
| 4,067,585 A | 1/1978 | Rode | |
| 4,269,400 A * | 5/1981 | Jensen | 267/153 |
| 4,745,846 A | 5/1988 | Eickmann | |
| 4,799,654 A | 1/1989 | Eickmann | |
| 4,968,010 A * | 11/1990 | Odobasic | 267/162 |
| 5,065,988 A | 11/1991 | Wedell | |
| 5,072,917 A | 12/1991 | Pleva | |
| 5,112,178 A | 5/1992 | Overhues et al. | |
| 5,222,718 A | 6/1993 | Buck | |
| 5,549,397 A | 8/1996 | Rode | |
| 6,244,751 B1 | 6/2001 | Rode | |
| 6,314,832 B1 | 11/2001 | Graber et al. | |
| 6,702,082 B2 * | 3/2004 | Dorfler et al. | 192/70.18 |
| 7,134,648 B1 | 11/2006 | Rode | |
| 7,195,235 B2 | 3/2007 | Rode | |
| 7,475,873 B2 | 1/2009 | Rode | |

FOREIGN PATENT DOCUMENTS

| | | |
|---|---|---|
| DE | 2323642 A | 11/1974 |
| DE | 3635156 A1 | 4/1987 |
| DE | 3633053 A1 | 4/1988 |
| EP | 240810 A2 * | 10/1987 |
| JP | 52-022648 A | 2/1977 |
| JP | 10-054432 A | 2/1998 |

* cited by examiner

*Primary Examiner* — Xuan Lan Nguyen
(74) *Attorney, Agent, or Firm* — Heslin Rothenberg Farley & Mesiti P.C.; Nicholas Mesiti, Esq.; Victor Cardona, Esq.

(57) ABSTRACT

Disc springs that are resistant to premature failure caused by friction wear, disc spring assemblies and disc spring stacks including the disc springs, and methods of making and using said assemblies and stacks are disclosed.

12 Claims, 3 Drawing Sheets

STACKABLE BELLEVILLE SPRING

FIELD OF THE INVENTION

The invention relates generally to disc springs and disc spring stacks that are resistant to friction wear.

BACKGROUND OF THE INVENTION

Disc springs, sometimes referred to as Belleville washers or Belleville springs, are conical shaped washers which are designed to be loaded in an axial direction. Under high loads disc springs produce small deflections, as compared with other types of springs such as helical or coil springs.

Variable spring characteristics can be achieved by stacking a plurality of disc springs. A problem with stacking a plurality of disc springs, particularly, when stacking in parallel, is the need to maintain the plurality of disc springs in the stack when a force is applied axially on the stack. Furthermore, when such a force is applied axially to a parallel spring stack, the adjacent surfaces of the disc springs may rub against each other, causing friction wear. This friction wear is often the cause of premature failure of disc spring configurations.

There is a need for improved disc springs and disc spring stacks and configurations.

SUMMARY OF THE INVENTION

The present invention provides, in a first aspect, a generally conically shaped disc spring which includes a first radial inner portion defining a center hole therein and a first radial outer portion. The first radial inner portion of the disc spring has a downwardly-depending portion and the first radial outer portion of the disc spring has an upwardly-extending portion. The disc spring has a first intermediate portion which deflects under axial load between the first radial outer portion and the first radial inner portion. Further, the disc spring is configured to be stacked in parallel with another one or more of the same disc springs. When stacked, the intermediate portions of the stacked disc springs deflect under axial load while maintaining a space between the adjacent intermediate portions of the stacked The present invention provides, in a second aspect, a disc spring stack which includes a first assembly. The first assembly includes generally conically-shaped disc springs that are stacked in parallel such that the conical adjacent surfaces of successive disc springs are spaced apart. The first assembly includes a first generally conically-shaped disc spring that has a first radial inner portion that defines a center hole therein, and a first radial outer portion. The first radial inner portion has a downwardly-depending portion and the first radial outer portion has an upwardly-extending portion. The first disc spring has a first intermediate portion which deflects under axial load. The first assembly also includes a second generally conically-shaped disc spring that has a second radial inner portion that defines a center hole therein, and a second radial outer portion. The second radial inner portion has a downwardly-depending portion, and the second radial outer portion has an upwardly-extending portion. The second disc spring has a second intermediate portion which deflects under axial load. In the first assembly, the second disc spring is stacked in parallel on the first disc spring such that the upwardly-extending portion of the first radial outer portion of the first disc spring is received on the second radial outer portion of the second disc spring. Further, when stacked, the downwardly-depending portion of the second radial inner portion of the second disc spring is received on the first radial inner portion of the first disc spring. As a result, the first intermediate portion of the first disc spring and the second intermediate portion of the second disc spring deflect under axial load while maintaining a space therebetween so as to avoid friction between the surfaces and resulting hysteresis that can be avoided by separating the parallel surfaces.

The present invention provides, in a third aspect, a disc spring stack which includes a first assembly, as described above, and a second assembly. The second assembly includes a third generally conically-shaped disc spring that has a first radial inner portion that defines a center hole therein, and a first radial outer portion. The first radial inner portion has an upwardly-extending portion and the first radial outer portion has a downwardly-depending portion. The third disc spring has a first intermediate portion which deflects under axial load. The second assembly also includes a fourth generally conically-shaped disc spring that has a second radial inner portion that defines a center hole therein, and a second radial outer portion. The second radial inner portion has an upwardly-extending portion, and the second radial outer portion has a downwardly-depending portion. The fourth disc spring has a second intermediate portion which deflects under axial load. In the second assembly, the fourth disc spring is stacked in parallel on the third disc spring. Therefore, the upwardly-extending portion of the first radial inner portion of the third disc spring is received on the second radial inner portion of the fourth disc spring and the downwardly-depending portion of the second radial outer portion of the fourth disc spring is received on the first radial outer portion of the third disc spring so that the first intermediate portion of the third disc spring and the second intermediate portion of the fourth disc spring deflect under axial load while maintaining a space therebetween so as to avoid friction wear.

The present invention provides, in a fourth aspect, a disc spring stack which includes a first assembly and a second assembly, wherein said second assembly is connected to said first assembly such that the downwardly-depending portions of the third disc spring on the second assembly extend downward into the upwardly-extending portions of the second disc spring on the first assembly.

The present invention provides, in a fifth aspect, a disc spring stack which includes a first assembly and a second assembly, wherein a spacer is disposed at the point of connection between the first and second assemblies.

The present invention provides, in a sixth aspect, a disc spring stack which includes a first assembly and a second assembly, wherein the second assembly is connected to the first assembly such that the downwardly-depending portions of the third disc spring on the second assembly extend downward into a spacer, which the upwardly-extending portions of the second disc spring on the first assembly extend upward into.

The present invention provides, in a seventh aspect, a method of making a disc spring stack that includes a first assembly of generally conically-shaped disc springs that are stacked in parallel such that the conical adjacent surfaces of successive disc springs are spaced apart. This method includes obtaining a first generally conically-shaped disc spring that has a first radial inner portion defining a center hole therein and a first radial outer portion. The first radial inner portion has a downwardly-depending portion and the first radial outer portion has an upwardly-extending portion. The first disc spring has a first intermediate portion which deflects under axial load. Next, a second generally conically-shaped disc spring is obtained, which has a second radial inner portion defining a center hole therein and a second radial outer portion. The second radial inner portion has a downwardly-depending portion, and the second radial outer portion has an upwardly-extending portion. The second disc spring has a second intermediate portion which deflects under axial load. Next, the second disc spring is stacked in parallel on the first disc spring, such that the upwardly-extending portion of the first radial outer portion of the first disc spring is received on the second radial outer portion of the second disc spring. As a result of this method, the downwardly-depending portion of the second radial inner portion of the second disc spring is received on the first radial inner portion of the first disc spring, so as to allow the first intermediate portion of the first disc spring and the second intermediate portion of the second disc spring to deflect under axial load while maintaining a space therebetween so as to avoid friction wear.

The present invention provides, in an eighth aspect, a method of making a disc spring stack that includes a first and second assembly.

BRIEF DESCRIPTION OF THE DRAWINGS

The subject matter which is regarded as the invention is particularly pointed out and distinctly claimed in the concluding portion of the specification. The invention, however, may be understood by reference to the following detailed descriptions of the following embodiments and the accompanying drawings in which:

DETAILED DESCRIPTION OF THE INVENTION

The disc springs and disc spring stacks of the present invention include a plurality of generally conically-shaped disc springs in which adjacent disc springs fit together and are held together in axial alignment. The disc spring stacks generally comprise a ring-shaped configuration and include an outer peripheral edge, which may be positioned within a cylindrically-shaped cavity or tube (not shown), and an inner edge, which may be positioned about a shaft or aligning rod (not shown). The disc springs may optionally be interlocking, which feature would allow the assemblies to be used without any confining cylinder or shaft in order to hold the disc springs in alignment, particularly under an axial load applied to the disc spring stack.

Figure 1A:
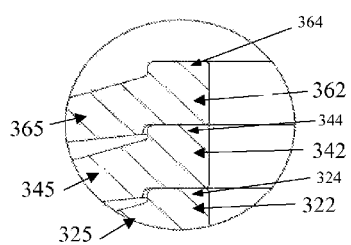
FIG. 1A, an exploded view of a section shown in FIG. 1, is a cross-sectional view of three disc springs that are stacked in parallel, and shows that the disc springs are configured such that the surfaces of adjacent springs will not rub against one another under axial load.
Figure 1:
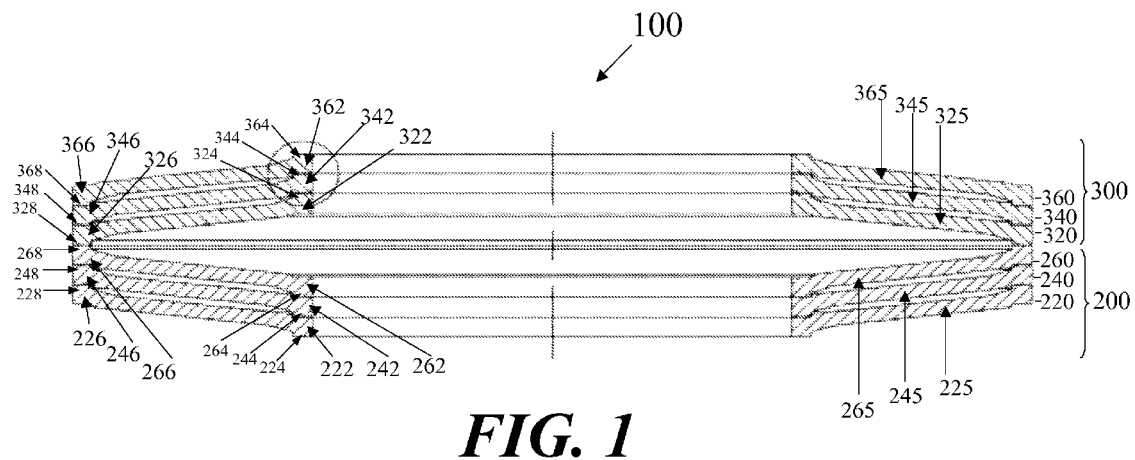
FIG. 1 is a cross-sectional view of a disc spring stack that has a first assembly stacked in series with a second assembly, each assembly having three disc springs stacked in parallel.

FIG. 1 illustrates a disc spring stack 100, in accordance with the present invention, having a first assembly 200, and a second assembly 300, with said assemblies stacked in series with one another. In general, stacking assemblies of disk springs in series with one another results in increased deflection, proportional to the number of assemblies in a stack.

First assembly 200 includes a first disc spring 220, a second disc spring 240, and a third disc spring 260. First disc spring 220 has a first radial inner portion 222, a first radial outer portion 226, and a first intermediate portion 225 between the first radial inner portion 222 and the first radial outer portion 226, which deflects under axial load. First radial inner portion 222 defines a first central opening therethrough and includes a downwardly-depending portion 224. First radial outer portion 226 includes an upwardly-extending portion 228. "Upwardly" and "downwardly" are used herein to refer to directions when the disc springs described herein are stacked atop one another. Specifically, "upwardly" refers to a direction generally toward a first end of the stack of disc springs and "downwardly" refers to a direction generally toward a second end of the stack.

First disc spring 220 is stacked in parallel with disc springs 240 and 260, which share the same orientation. Generally, stacking disc springs in parallel increases the load proportional to the number of springs in parallel with one another. Second disc spring 240 has a second radial inner portion 242, a second radial outer portion 246, and a second intermediate portion 245 between the second radial inner portion 242 and the second radial outer portion 246, which deflects under axial load. Second radial inner portion 242 defines a second central opening therethrough and includes a downwardly-depending portion 244. Second radial outer portion 246 includes an upwardly-extending portion 248. Third disc spring 260 has a third radial inner portion 262, a third radial outer portion 266, and a third intermediate portion 265 between the third radial inner portion 262 and the third radial outer portion 266, which deflects under axial load. Third radial inner portion 262 defines a third central opening therethrough and includes a downwardly-depending portion 264. Third radial outer portion 266 includes an upwardly-extending portion 268.

As illustrated in FIG. 1, downwardly-depending portion 244 of second radial inner portion 242 of disc spring 240 is receivable within first radial inner portion 222 of disc spring 220 when disc spring 240 is stacked in parallel on disc spring 220. In addition, upwardly-extending portion 228 of first radial outer portion 226 of disc spring 220 is receivable in second radial outer portion 246 of disc spring 240. When disc springs are stacked on one another, for example, when disc spring 240 is stacked on disc spring 220, the surfaces of the adjacent disc springs may be aligned with one another. It will also be appreciated, however, that the first opening and the second opening may comprise different configurations or sizes and need not be alignable.

FIG. 1 shows that downwardly-depending portion 264 of third radial inner portion 262 of disc spring 260 is receivable within second radial inner portion 242 of disc spring 240 when disc spring 260 is stacked in parallel on disc spring 240. In addition, upwardly-extending portion 248 of second radial outer portion 246 of disc spring 240 is receivable in third radial outer portion 266 of disc spring 260.

Second assembly 300 of disc spring stack 100 includes a fourth disc spring 320, a fifth disc spring 340, and a sixth disc spring 360. Disc spring 320 has a first radial inner portion 322, a first radial outer portion 326, and a first intermediate portion 325 between first radial inner portion 322 and first radial outer portion 326, which deflects under axial load. First radial inner portion 322 defines a first central opening therethrough and includes an upwardly-extending portion 324. First radial outer portion 326 includes a downwardly-extending portion 328.

FIG. 1 shows that fourth disc spring 320 is stacked in parallel with fifth disc spring 340 and sixth disc spring 360. Fifth disc spring 340 has a second radial inner portion 342, a second radial outer portion 346, and a second intermediate portion 345 between second radial inner portion 342 and second radial outer portion 346, which deflects under axial load. Second radial inner portion 342 defines a second central opening therethrough and includes an upwardly-extending portion 344. Second radial outer portion 346 includes a downwardly-depending portion 348. Sixth disc spring 360 has a third radial inner portion 362, a third radial outer portion 366, and a third intermediate portion 365 between third radial inner portion 362 and third radial outer portion 366, which deflects under axial load. Third radial inner portion 362 defines a third central opening therethrough and includes an upwardly-extending portion 364. Third radial outer portion 366 includes a downwardly-depending portion 368.

Downwardly-depending portion 348 of second radial outer portion 346 of disc spring 340 is receivable within first radial outer portion 326 of disc spring 320 when disc spring 340 is stacked in parallel on disc spring 320. In addition, upwardly-extending portion 324 of first radial inner portion 322 of disc spring 320 is receivable in second radial inner portion 342 of disc spring 340. Similarly, downwardly-depending portion 368 of third radial outer portion 366 of disc spring 360 is receivable within second radial outer portion 346 of disc spring 340 when disc spring 360 is stacked in parallel on disc spring 340. In addition, upwardly-extending portion 344 of second radial inner portion 342 of disc spring 340 is receivable in third radial inner portion 362 of disc spring 360.

It is an aspect of the instant invention that assemblies of disc springs stacked in parallel may be stacked in series with one another. This aspect is illustrated in FIG. 1, where assembly 200 is stacked in series with assembly 300. There, downwardly-depending portion 328 of first radial outer portion 326 of disc spring 320 rests on upwardly-extending portion 268 of third radial outer portion 266 of disc spring 260, so that the two assemblies are stacked in series with one another. Similarly, assemblies of disc springs may be stacked in series with one another by contact at the radial inner portions of the disc springs, as shown in FIG. 2. It will be appreciated that additional assemblies may be stacked in series with assemblies 200 and 300.

From the present description, it will be appreciated that a pair of first and second disc spring assemblies may be suitably used and stacked, for example, with their radial inner portions engaging or with their radial outer portions engaging.

It is a further aspect of the instant invention that the disc springs are configured such that when a disc spring is stacked in parallel with at least one other disc spring, the conical adjacent surfaces of successive disc springs are spaced apart so that they will not rub against each other. More specifically, it is an aspect of the instant invention that when the disc springs are stacked in parallel, intermediate portions of adjacent disc springs have a gap or space therebetween. Thus, the intermediate portion of a disc spring will not touch the intermediate portion of an adjacent disc spring in the parallel stack, even when there is a deflection under axial load. Furthermore, the intermediate portion of a disc spring preferably will not touch the radial inner portion or the radial outer portion of adjacent disc springs with which it is stacked in parallel, or the upwardly-extending or downwardly-depending portions thereof, even upon deflecting a specified amount under axial load. This aspect of the present invention represents a significant advantage over the prior art insofar as it prevents premature failure of disc springs due to friction wear.

FIG. 1A, which is an exploded view of a section shown in FIG. 1, illustrates this aspect of the invention. Because of the configuration of the disc springs, the adjacent surfaces of the intermediate portions 325, 345, and 365 of disc springs 320, 340, and 360 are separated by a space or gap therebetween and do not rub against one another when they deflect under an axial force. As shown in FIG. 1A, even upon deflecting under axial load, second intermediate portion 345 of disc spring 340 will not rub against first intermediate portion 325 of first of disc spring 320. Likewise, second intermediate portion 345 will not rub against upwardly-extending portion 324 of first radial inner portion 322 of disc spring 320 when it deflects, at least for a specified amount. Similarly, when third intermediate portion 365 deflects, it will not touch second intermediate portion 345, or upwardly-extending portion 344 of second radial inner portion 342 of disc spring 340, at least for a specified amount.

FIG. 2 illustrates a disc spring stack 400 that has a first assembly 500, a second assembly 600, and a third assembly 700, which are stacked in series with one another. First assembly 500 includes a first disc spring 520, a second disc spring 540, and a third disc spring 560, the three of which are stacked in parallel with one another.

First disc spring 520 has a first radial inner portion 522, a first radial outer portion 526, and a first intermediate portion 525 between first radial inner portion 522 and first radial outer portion 526, which deflects under axial load. First radial inner portion 522 defines a first central opening therethrough and includes a downwardly-depending portion 524. First radial outer portion 526 includes an upwardly-extending portion 528. Second disc spring 540 has a second radial inner portion 542, a second radial outer portion 546, and a second intermediate portion 545 between second radial inner portion 542 and second radial outer portion 546, which deflects under axial load. Second radial inner portion 542 defines a second central opening therethrough and includes a downwardly-depending portion 544. Second radial outer portion 546 includes an upwardly-extending portion 548. Third disc spring 560 has a third radial inner portion 562, a third radial outer portion 566, and a third intermediate portion 565 between third radial inner portion 562 and third radial outer portion 566, which deflects under axial load. Third radial inner portion 562 defines a third central opening therethrough and includes a downwardly-depending portion 564. Third radial outer portion 566 includes an upwardly-extending portion 568.

Second assembly 600 includes a fourth disc spring 620, a fifth disc spring 640, and a sixth disc spring 660, the three of which are stacked in parallel with one another. Fourth disc spring 620 has a first radial inner portion 622, a first radial outer portion 626, and a first intermediate portion 625 between first radial inner portion 622 and first radial outer portion 626, which deflects under axial load. First radial inner portion 622 defines a first central opening therethrough and includes an upwardly-extending portion 624. First radial outer portion 626 includes a downwardly-depending portion 628. Fifth disc spring 640 has a second radial inner portion 642, a second radial outer portion 646, and a second intermediate portion 645 between second radial inner portion 642 and second radial outer portion 646, which deflects under axial load. Second radial inner portion 642 defines a second central opening therethrough and includes an upwardly-extending portion 644. Second radial outer portion 646 includes a downwardly-depending portion 648. Sixth disc spring 660 has a third radial inner portion 662, a third radial outer portion 666, and a third intermediate portion 665 between third radial inner portion 662 and third radial outer portion 666, which deflects under axial load. Third radial inner portion 662 defines a third central opening therethrough and includes an upwardly-extending portion 664. Third radial outer portion 666 includes a downwardly-depending portion 668.

Third assembly 700 includes a seventh disc spring 720, an eighth disc spring 740, and a ninth disc spring 760, the three of which are stacked in parallel with one another. Seventh disc spring 720 has a first radial inner portion 722, a first radial outer portion 726, and a first intermediate portion 725 between first radial inner portion 722 and first radial outer portion 726, which deflects under axial load. First radial inner portion 722 defines a first central opening therethrough and includes a downwardly-depending portion 724. First radial outer portion 726 includes an upwardly-extending portion 728. Eighth disc spring 740 has a second radial inner portion 742, a second radial outer portion 746, and a second intermediate portion 745 between second radial inner portion 742 and second radial outer portion 746, which deflects under axial load. Second radial inner portion 742 defines a second central opening therethrough and includes a downwardly-depending portion 744. Second radial outer portion 746 includes an upwardly-extending portion 748. Ninth disc spring 760 has a third radial inner portion 762, a third radial outer portion 766, and a third intermediate portion 765 between third radial inner portion 762 and third radial outer portion 766, which deflects under axial load. Third radial inner portion 762 defines a third central opening therethrough and includes a downwardly-depending portion 764. Third radial outer portion 766 includes an upwardly-extending portion 768.

As shown in FIG. 2, assemblies 500, 600, and 700 are stacked in series with one another. Downwardly-depending portion 628 of first radial outer portion 626 of disc spring 620 makes contact with upwardly-extending portion 568 of third radial outer portion 566 of disc spring 560 when assembly 600 is stacked in series on assembly 500. Furthermore, downwardly-depending portion 724 of first radial inner portion 722 of disc spring 720 contacts with upwardly-extending portion 664 of third radial inner portion 662 when assembly 700 is stacked in series on assembly 600.

Figure 2A:
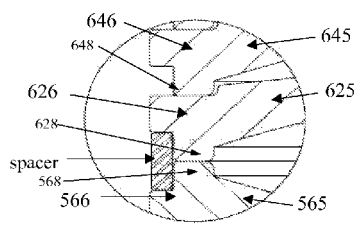
FIG. 2A, an exploded view of a section shown in FIG. 2, is a cross-sectional view of two parallel-stacked disc springs that comprise part of a first assembly, and one disc spring from a second assembly that is stacked in series adjacent to the first assembly, as well as a spacer that is disposed at the point of contact between the assemblies.
Figure 2:
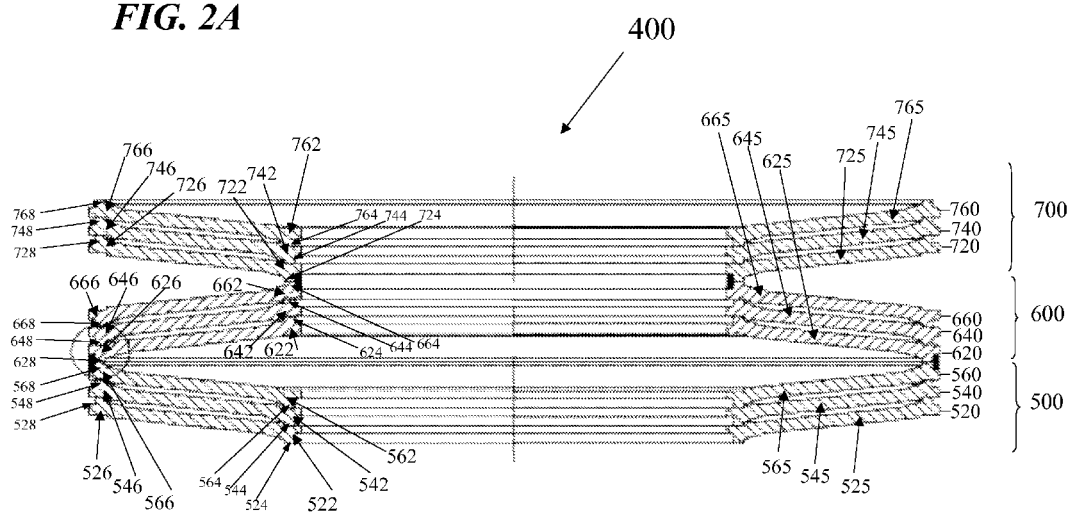
FIG. 2 is a cross-sectional view of a disc spring stack that has a first, a second, and a third assembly, which are stacked in series with one another, each assembly having three disc springs stacked in parallel, with spacers disposed at the points of contact between the assemblies.

As illustrated in FIG. 2A, which is an exploded view of a section shown in FIG. 2, the disc springs in assemblies 500, 600, and 700 have a slightly different configuration than the disc springs in assemblies 200 and 300 from FIG. 1. Despite this difference, the disc springs still share the same aspect whereby intermediate portions of parallel-stacked disc springs have a space or gap therebetween and do not touch the intermediate portions, the inner or outer portions, or the upwardly-extending or downwardly-depending portions thereof, of adjacent disc springs. For example, FIG. 2A shows that when it deflects, second intermediate portion 645 of disc spring 640 will not rub against first intermediate portion 625 or, for at least a specified amount of deflection, first radial outer portion 626 of disc spring 620.

In some embodiments the present invention includes spacers disposed between radial inner and/or radial outer portions where disc spring assemblies are connected in series. This aspect of the invention permits additional rotational deflection of the component springs as the stacks are compressed, and is illustrated in FIG. 2 and FIG. 3. FIG. 2 illustrates spacers disposed at the point of connection between assembly 500 and assembly 600, as well as at the point of connection between assembly 600 and assembly 700.

FIG. 3 illustrates a disc spring stack 800 that has a first assembly 900, a second assembly 1000, and a third assembly 1100, which are stacked in series with one another, with each assembly including three disc springs that are stacked in parallel with one another.

In FIG. 3, first assembly 900 includes a first disc spring 920, a second disc spring 940, and a third disc spring 960, the three of which are stacked in parallel with one another. First disc spring 920 has a first radial inner portion 922, a first radial outer portion 926, and a first intermediate portion 925 between first radial inner portion 922 and first radial outer portion 926, which deflects under axial load. First radial inner portion 922 defines a first central opening therethrough and includes a downwardly-depending portion 924. First radial outer portion 926 includes an upwardly-extending portion 928. Second disc spring 940 has a second radial inner portion 942, a second radial outer portion 946, and a second intermediate portion 945 between second radial inner portion 942 and second radial outer portion 946, which deflects under axial load. Second radial inner portion 942 defines a second central opening therethrough and includes a downwardly-depending portion 944. Second radial outer portion 946 includes an upwardly-extending portion 948. Third disc spring 960 has a third radial inner portion 962, a third radial outer portion 966, and a third intermediate portion 965 between third radial inner portion 962 and third radial outer portion 966, which deflects under axial load. Third radial inner portion 962 defines a third central opening therethrough and includes a downwardly-depending portion 964. Third radial outer portion 966 includes an upwardly-extending portion 968.

Second assembly 1000 includes a fourth disc spring 1020, a fifth disc spring 1040, and a sixth disc spring 1060, the three of which are stacked in parallel with one another. Fourth disc spring 1020 has a first radial inner portion 1022, a first radial outer portion 1026, and a first intermediate portion 1025 between first radial inner portion 1022 and first radial outer portion 1026, which deflects under axial load. First radial inner portion 1022 defines a first central opening therethrough and includes an upwardly-extending portion 1024. First radial outer portion 1026 includes a downwardly-depending portion 1028. Fifth disc spring 1040 has a second radial inner portion 1042, a second radial outer portion 1046, and a second intermediate portion 1045 between second radial inner portion 1042 and second radial outer portion 1046, which deflects under axial load. Second radial inner portion 1042 defines a second central opening therethrough and includes an upwardly-extending portion 1044. Second radial outer portion 1046 includes a downwardly-depending portion 1048. Sixth disc spring 1060 has a third radial inner portion 1062, a third radial outer portion 1066, and a third intermediate portion 1065 between third radial inner portion 1062 and third radial outer portion 1066, which deflects under axial load. Third radial inner portion 1062 defines a third central opening therethrough and includes an upwardly-extending portion 1064. Third radial outer portion 1066 includes a downwardly-depending portion 1068.

Third assembly 1100 includes a seventh disc spring 1120, an eighth disc spring 1140, and a ninth disc spring 1160, the three of which are stacked in parallel with one another. Seventh disc spring 1120 has a first radial inner portion 1122, a first radial outer portion 1126, and a first intermediate portion 1125 between first radial inner portion 1122 and first radial outer portion 1126, which deflects under axial load. First radial inner portion 1122 defines a first central opening therethrough and includes a downwardly-depending portion 1124. First radial outer portion 1126 includes an upwardly-extending portion 1128. Eighth disc spring 1140 has a second radial inner portion 1142, a second radial outer portion 1146, and a second intermediate portion 1145 between second radial inner portion 1142 and second radial outer portion 1146, which deflects under axial load. Second radial inner portion 1142 defines a second central opening therethrough and includes a downwardly-depending portion 1144. Second radial outer portion 1146 includes an upwardly-extending portion 1148. Ninth disc spring 1160 has a third radial inner portion 1162, a third radial outer portion 1166, and a third intermediate portion 1165 between third radial inner portion 1162 and third radial outer portion 1166, which deflects under axial load. Third radial inner portion 1162 defines a third central opening therethrough and includes a downwardly-depending portion 1164. Third radial outer portion 1166 includes an upwardly-extending portion 1168.

FIG. 3 illustrates that in some embodiments, the present invention may use spacers that are disposed between the points of connection of assemblies that are stacked in series. For example, as shown in FIG. 3, and in FIG. 3A, which is an exploded view of a section shown in FIG. 3, downwardly-depending portion 1124 of first radial inner portion 1122 of seventh disc spring 1120 depends downward into a spacer. Upwardly-extending portion 1064 of third radial inner portion 1062 of sixth disc spring 1060 extends upward into the same spacer, which connects the two assemblies.

Figure 3A:
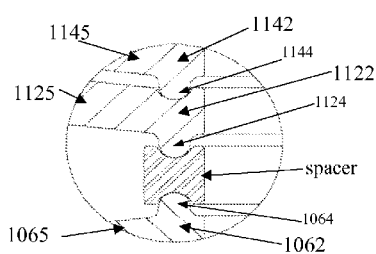
FIG. 3A, an exploded view of a section shown in FIG. 3, is a cross-sectional view of two parallel-stacked disc springs that comprise part of a first assembly, and one disc spring from a second assembly that is stacked in series adjacent to the first assembly, as well as a spacer that is disposed between the points of contact of the assemblies.
Figure 3:
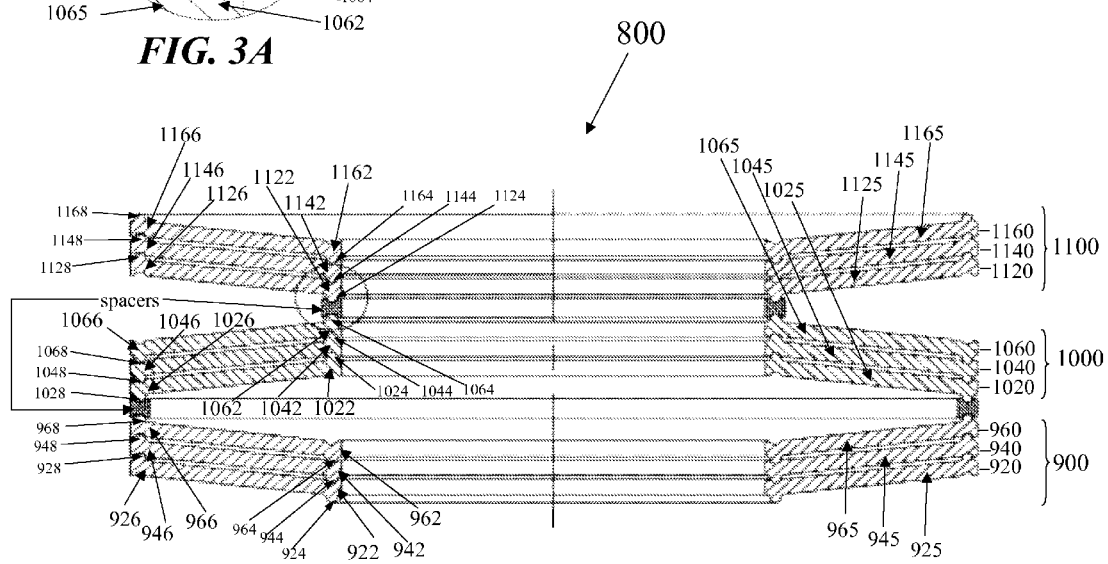
FIG. 3 is a cross-sectional view of a disc spring stack that has a first, a second, and a third assembly, which are stacked in series with one another, each assembly having three disc springs stacked in parallel, with spacers disposed between the points of contact of the assemblies.

As illustrated in FIG. 3A, the disc springs in spring stack 800 have a slightly different configuration than the disc springs in spring stacks 100 and 400. However, as in disc spring stacks 100 and 400, the disc springs in stack 800 still share the same aspect whereby intermediate portions of parallel-stacked disc springs have a gap or space therebetween and do not touch the intermediate portions, the inner or outer portions, or the upwardly-extending or downwardly-depending portions thereof, of adjacent disc springs. For example, FIG. 3A shows that because of its shape, when eighth disc spring 1140 deflects, its second intermediate portion 1145 will not rub against first intermediate portion 1125 or, for at least a specified amount of deflections, the first radial inner portion 1122 of disc spring 1120.

The above-described disc springs may be formed from heat treatable spring steel or tool steel alloys such as AISI D-2 or AISI H-11, high temperature alloys such as Inconel 625, or heat treatable precipitation hardening alloys such as Inconel 718, for example. The spacers may be formed from ductile stainless steel such as 304 stainless steel or Inconel 625, for example. The disc springs described above may be formed by machining. Alternatively, the disc springs described above may be formed by stamping, as will be understood by those skilled in the art.

The disc springs may be pre-coated with a sealant before assembly or may be coated after assembly of the disc spring assemblies and stacks. The coatings may include a soft compliant material such as butyl rubber, Teflon, or a soft metal such as gold or silver.

The above-described disc springs, disc spring assemblies, and disc spring stacks may be utilized as sealing elements for various static (e.g., non-rotating) applications or dynamic (e.g., rotating) applications which typically require that the sealing elements have significant flexibility. In addition, the uppermost and lowermost disc springs of the disc spring stacks may be formed with a sharpened edge at their radial outer portions so that a seal might be formed by imbedding the sharpened ends of the disc spring into the structure (not shown) to be sealed.

The disc springs and spacers in accordance with the present invention may be formed in any shape or size to allow resiliency, adjustability, and compression in any desired direction, when received in any number of restricted spaces, as will be understood by those skilled in the art. For example, it would be evident from the above description to one skilled in the art that the upwardly-extending portions of the disc springs described above could be downwardly-depending and the downwardly-depending portions of the disc springs described above could be upwardly-extending. Also, the spacers described above may be optionally adjustable, and may be adapted to receive only one disc spring while the free ends of the spacer may be adapted to engage a surface or object, as will be understood by those skilled in the art.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A disc spring system comprising:
a first disc spring having a first radial inner portion defining a center hole therein;
a first radial outer portion of said first disc spring;
said first radial inner portion having a downwardly-depending portion and said first radial outer portion having an upwardly-extending portion;
a first intermediate portion of said first disc spring which deflects under axial load, said first intermediate portion extending from said first radial outer portion to said first radial inner portion;
said first intermediate portion comprising a first top intermediate side and a first bottom intermediate side,
said first radial inner portion having a first top inner side and a first bottom inner side,
wherein said first disc spring is stacked in parallel with a second disc spring, said first intermediate portion and a second intermediate portion of said second disc spring deflecting under axial-load; and
wherein said first top intermediate portion comprises a first radially inward facing adjacent surface located at an endmost point of said first top intermediate side closest to said first top inner side and bounded by said first top intermediate side and said first top inner side, said first adjacent surface and a second radially outward facing adjacent surface of a second inner portion of said second disc spring-facing one another and bounding a space therebetween so as to avoid friction wear when said first intermediate portion of said first disc spring and a second intermediate portion of said second disc spring deflect under the axial load, said second radially outwardly facing adjacent surface located at an end of a second bottom inner side of a second radial inner portion of said second disc spring and bounded by said second bottom inner side and said second bottom intermediate side.

2. A disc spring stack comprising a first assembly of generally conically-shaped disc springs that are stacked in parallel such that the conical adjacent surfaces of successive disc springs are spaced apart, said first assembly comprising:
a first generally conically-shaped disc spring having a first radial inner portion defining a first center hole therein and a first radial outer portion, said first radial inner portion having a first downwardly-depending portion and said first radial outer portion having a first upwardly-extending portion, said first disc spring having a first intermediate portion connecting said first inner portion to said first outer portion and which deflects under axial load;

said first inner portion having a first top inner side and a first bottom inner side, said first intermediate portion comprising a first top intermediate side and a first bottom intermediate side;

a second generally conically-shaped disc spring having a second radial inner portion defining a second center hole therein and a second radial outer portion, said second radial inner portion having a second downwardly-depending portion, and said second radial outer portion having a second upwardly-extending portion, said second disc spring having a second intermediate portion connecting said second inner portion to said second outer portion and which deflects under axial load;

said second radial inner portion having a second top inner side and a second bottom inner side;

said second intermediate portion comprising a second top intermediate side and a second bottom intermediate side;

wherein said second disc spring is stacked in parallel on the first disc spring, such that said second bottom inner side is received on said first top inner side; and said first intermediate portion comprising a first adjacent surface facing radially inwardly and located at an endmost point of said first top intermediate side closest to said first top inner side between said first top intermediate side and said first top inner side, said first adjacent surface extending upwardly from said first top inner surface toward said second disc spring said second radial inner portion comprising a second adjacent surface facing radially outwardly and located at an end of said bottom inner side and between said bottom inner side and said second bottom intermediate side, said first adjacent surface and said second adjacent surface facing one another and bounding a space therebetween so as to avoid friction wear when said first intermediate portion of said first disc spring and said second intermediate portion of said second disc spring deflect under axial load.

3. A disc spring stack according to claim 2 wherein said first assembly further comprises a third disc spring, stacked in parallel on said second disc spring.

4. A disc spring stack according to claim 2 further comprising a second assembly, said second assembly comprising:
a third generally conically-shaped disc spring having a third radial inner portion defining a third center hole therein and a third radial outer portion, said third radial inner portion having a third upwardly-extending portion and said third radial outer portion having a third downwardly-depending portion, having a third intermediate portion which deflects under axial load;
a fourth generally conically-shaped disc spring having a fourth radial inner portion defining a fourth center hole therein and a fourth radial outer portion, said fourth radial inner portion having a fourth upwardly-extending portion, and said fourth radial outer portion having a fourth downwardly-depending portion, having a fourth intermediate portion which deflects under axial load;
said fourth disc spring stacked in parallel on the third disc spring, such that the third upwardly-extending portion of the third radial inner portion of the third disc spring is received on the fourth radial inner portion of the fourth disc spring and
the fourth downwardly-depending portion of the fourth radial outer portion of the fourth disc spring is received on the third radial outer portion of the third disc spring, allows said third intermediate portion of said third disc spring and said fourth intermediate portion of said fourth disc spring to deflect under axial load while maintaining a space therebetween so as to avoid friction wear.

5. A disc spring stack according to claim 4 wherein said second assembly further comprises a fifth disc spring, stacked in parallel on said fourth disc spring.

6. A disc spring stack according to claim 4 wherein said second assembly is connected to said first assembly such that the third downwardly-depending portion of the third disc spring of the second assembly extends downward to contact the second upwardly-extending portion of the second disc spring of the first assembly.

7. A disc spring stack according to claim 6 wherein a spacer is disposed at the point of connection between the first and second assemblies.

8. A disc spring stack according to claim 4 wherein said second assembly is connected to said first assembly such that the downwardly-depending portions of the third disc spring on the second assembly extend downward into a spacer, which the upwardly-extending portions of the second disc spring on the first assembly extend upward into.

9. The stack of claim 2 wherein said first adjacent surface and said second adjacent surface comprise longitudinal dimensions extending axially relative to an axis extending through a first center of said first center hole and a second center of said second center hole.

10. The stack of claim 2 wherein said second adjacent surface and said space extend axially past said first top intermediate surface in a distal axial direction relative to an axis extending from a first center of said first center hole toward a second center of said second center hole and in a direction away from said second bottom intermediate side.

11. A method of making a disc spring stack comprising a first assembly of generally conically-shaped disc springs that are stacked in parallel such that the conical adjacent surfaces of successive disc springs are spaced apart, comprising:
obtaining a first generally conically-shaped disc spring having a first radial inner portion defining a first center hole therein and a first radial outer portion, said first radial inner portion having a downwardly-depending portion and said first radial outer portion having an upwardly-extending portion, said first disc spring having a first intermediate portion which deflects under axial load;
said first inner portion having a first top inner side and a first bottom inner side,
said first intermediate portion comprising a first top intermediate side,
obtaining a second generally conically-shaped disc spring having a second radial inner portion defining a second center hole therein and a second radial outer portion, said second radial inner portion having a second downwardly-depending portion, and said second radial outer portion having a second upwardly-extending portion, said second disc spring having a second intermediate portion which deflects under axial load;
said second inner portion having a second top inner side and a second bottom inner side,
said second intermediate portion comprising a second top intermediate side and a second bottom intermediate side;
stacking said second disc spring in parallel on the first disc spring,
such that said second bottom inner side is received on said first top inner side ; and said first intermediate portion comprising a first adjacent surface facing radially inwardly and located at an endmost point of said first top intermediate side closest to said first top inner side between said first top intermediate side and said first top inner side, said first adjacent surface extending upwardly from said first top inner surface toward said second disc spring, said second radial inner portion comprising a second adjacent surface facing radially outwardly and bounded by said second bottom inner side and said second bottom intermediate side, said first adjacent surface and said second adjacent surface facing one another and bounding a space therebetween so as to avoid friction wear when said first intermediate portion of said first disc spring and said second intermediate portion of said second disc spring deflect under axial load.

12. A disc spring stack comprising a first assembly of generally conically-shaped disc springs that are stacked in parallel such that the conical adjacent surfaces of successive disc springs are spaced apart, said first assembly comprising:

a first generally conically-shaped disc spring having a first radial inner portion defining a first center hole therein and a first radial outer portion, said first radial inner portion having a first downwardly-depending portion and said first radial outer portion having a first upwardly-extending portion, said first disc spring having a first intermediate portion connecting said first inner portion to said first outer portion and which deflects under axial load;

said first inner portion having a first top inner side and a first bottom inner side, said first intermediate portion comprising a first top intermediate side and a first bottom intermediate side; a second generally conically-shaped disc spring having a second radial inner portion defining a second center hole therein and a second radial outer portion, said second radial inner portion having a second downwardly-depending portion, and said second radial outer portion having a second upwardly-extending portion, said second disc spring having a second intermediate portion connecting said second inner portion to said second outer portion and which deflects under axial load;

said second radial inner portion having a second top inner side and a second bottom inner side;

said second intermediate portion comprising a second top intermediate side and a second bottom intermediate side;

wherein said second disc spring is stacked in parallel on the first disc spring, such that said second bottom inner side is received on said first top inner side; and said first top intermediate portion comprising a first adjacent surface facing radially inwardly and located at an endmost point of said first top intermediate side closest to said first top inner side, said second bottom inner portion comprising a second adjacent surface facing radially outwardly and bounded by said second bottom intermediate side and said second bottom inner side, said second adjacent surface facing said first adjacent surface forming a space therebetween, and said second adjacent surface extending axially past an end of said first top intermediate surface bounding said first adjacent surface in a distal axial direction relative to an axis extending from a first center of said first center hole toward a second center of said second center hole and in a direction away from said second bottom intermediate side.

* * * * *